US012620265B2

(12) United States Patent
Leitmann

(10) Patent No.: US 12,620,265 B2
(45) Date of Patent: May 5, 2026

(54) BIOMETRIC CAPTURE SYSTEM AND ASSOCIATED METHOD

(71) Applicant: VISION BOX-SOLUÇÕES DE VISÃO POR COMPUTADOR, S.A, Carnaxide (PT)

(72) Inventor: Miguel Guilherme Leitmann, Carnaxide (PT)

(73) Assignee: VISION BOX-SOLUÇÕES DE VISÃO POR COMPUTADOR, S.A, Carnaxide (PT)

( * ) Notice: Subject to any disclaimer, the term of this patent is extended or adjusted under 35 U.S.C. 154(b) by 265 days.

(21) Appl. No.: 18/707,130

(22) PCT Filed: Oct. 21, 2022

(86) PCT No.: PCT/PT2022/050027
§ 371 (c)(1),
(2) Date: May 2, 2024

(87) PCT Pub. No.: WO2023/080802
PCT Pub. Date: May 11, 2023

(65) Prior Publication Data
US 2025/0029426 A1      Jan. 23, 2025

(30) Foreign Application Priority Data

Nov. 4, 2021    (PT) ......................................... 117556

(51) Int. Cl.
*G06V 40/50* (2022.01)
*G06V 40/16* (2022.01)
(Continued)

(52) U.S. Cl.
CPC ............ *G06V 40/50* (2022.01); *G06V 40/165* (2022.01); *G06V 40/171* (2022.01);
(Continued)

(58) Field of Classification Search
None
See application file for complete search history.

(56) References Cited

U.S. PATENT DOCUMENTS 8,907,865 B2 * 12/2014 Miyawaki .............. G09G 3/003
359/630
11,170,085 B2 * 11/2021 Devine ................... G06F 21/32
(Continued)

FOREIGN PATENT DOCUMENTS

JP          2015220652 A    12/2015

OTHER PUBLICATIONS

Abiantun et al.("Automatic eye-level height system for face and iris recognition systems," Fourth IEEE Workshop on Automatic Iden-tification Advanced Technologies (AutoID'05), Buffalo, NY, USA, 2005, pp. 155-159, doi: 10.1109/AUTOID.2005.15). Provided by applicant. (Year: 2005).*

(Continued)

*Primary Examiner* — Anand P Bhatnagar
(74) *Attorney, Agent, or Firm* — PERRY + CURRIER INC.

(57) ABSTRACT

The present invention refers to a biometric capture system for enrolment, verification or identification of a person comprising a screen (1); an image capture module (2) which is configured to move along a vertical guiding device (3), and an interface (5), which is disposed between the superior edge of the screen (1) and the base of the vertical guiding device (3); and wherein a digital visual element (4) is displayed on said screen (1); and a visual element (6) is displayed on said image capture module (2); and the bio-metric capture system is configured to execute a synchro-nized transition between the digital visual element (4) and the visual element (6) through the interface (5) for keeping the focus of the person.

(Continued)

The invention provides solution, which handles naturally the human behaviour during a non-natural and unknown biometric capture process, making easier and faster the interaction with the user.

10 Claims, 6 Drawing Sheets

(51) Int. Cl.
  *G06V 40/18* (2022.01)
  *G06V 40/60* (2022.01)

(52) U.S. Cl.
  CPC .......... *G06V 40/172* (2022.01); *G06V 40/197* (2022.01); *G06V 40/67* (2022.01)

(56) References Cited

U.S. PATENT DOCUMENTS

| | | | | |
|---|---|---|---|---|
| 11,500,607 | B2 * | 11/2022 | Hudman | G02B 27/017 |
| 11,857,726 | B2 * | 1/2024 | Fu | A61M 16/06 |
| 11,928,200 | B2 * | 3/2024 | Van Os | G06V 40/67 |
| 12,189,748 | B2 * | 1/2025 | Van Os | G06F 21/316 |
| 2011/0249136 | A1 | 10/2011 | Levy et al. | |
| 2012/0293642 | A1 | 11/2012 | Berini et al. | |
| 2019/0370448 | A1 * | 12/2019 | Devine | G06F 21/32 |
| 2022/0011998 | A1 * | 1/2022 | Hudman | G02B 7/005 |
| 2022/0027446 | A1 * | 1/2022 | Van Os | G06F 21/32 |
| 2022/0272084 | A1 * | 8/2022 | Hyatt | H04W 12/06 |
| 2024/0184869 | A1 * | 6/2024 | Van Os | G06F 21/32 |

OTHER PUBLICATIONS

R. Abiantun, M. Savvides and P. K. Khosla, "Automatic eye-level height system for face and iris recognition systems," Fourth IEEE Workshop on Automatic Identification Advanced Technologies (AutoID'05), Buffalo, NY, USA, 2005, pp. 155-159, doi: 10.1109/AUTOID.2005.15.

Logitech.com, "Setup QuickCam Pro 4000". Available online: [https://download01.logitech.com/web/ftp/pub/pdf/cameras/qcpro4000.pdf].

Panasonic, Iris Recognition Camera System, BM-ET300 Series. Available online: [https://chasesecurity.com.au/downloads/iris_panasonicBM-ET300.pdf].

PCT International Search Report for International Application No. PCT/PT2022/050027, mailed Jan. 23, 2023, 4pp.

PCT Written Opinion for International Application No. PCT/PT2022/050027, mailed Jan. 23, 2023, 6pp.

PCT International Preliminary Report on Patentability for International Application No. PCT/PT2022/050027, issued May 2, 2024, 7pp.

* cited by examiner

[Fig. 1]
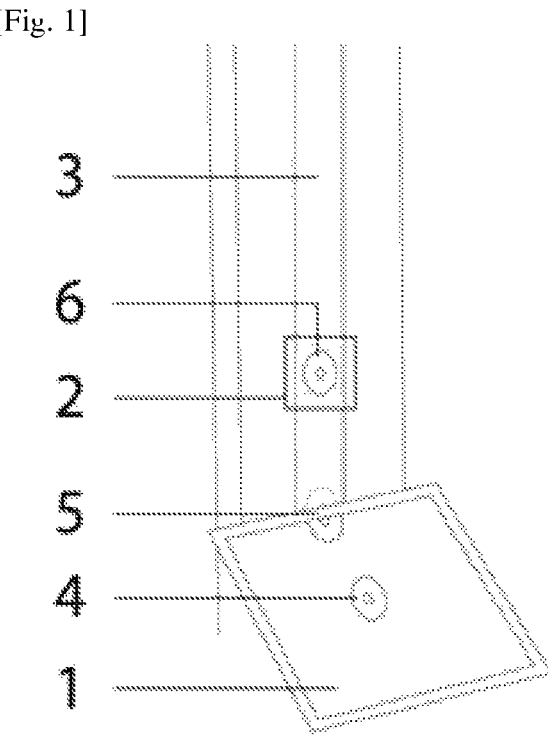
[Fig. 2]
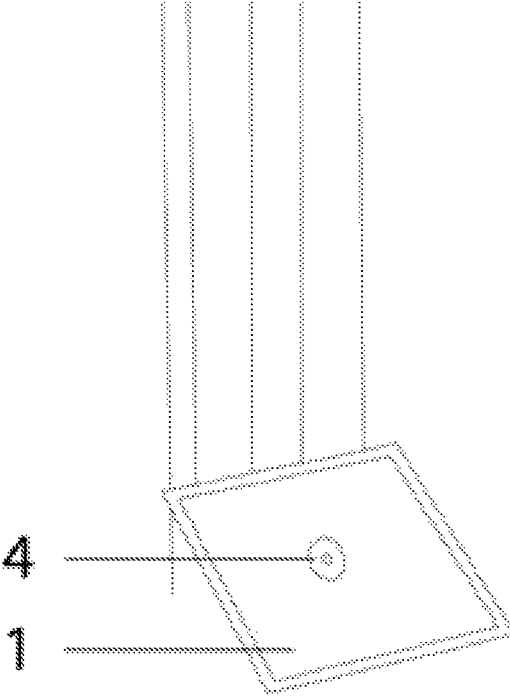

[Fig. 3]
[Fig. 4]
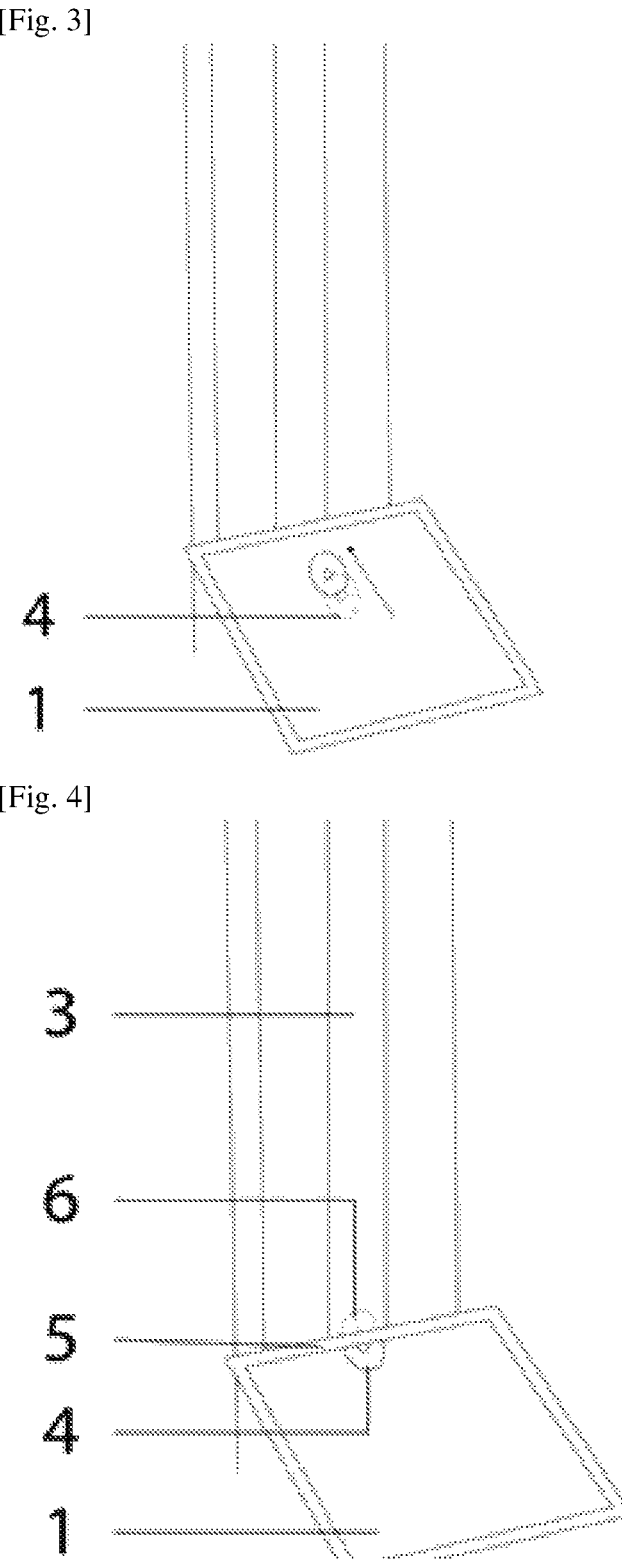

[Fig. 5]
[Fig. 6]
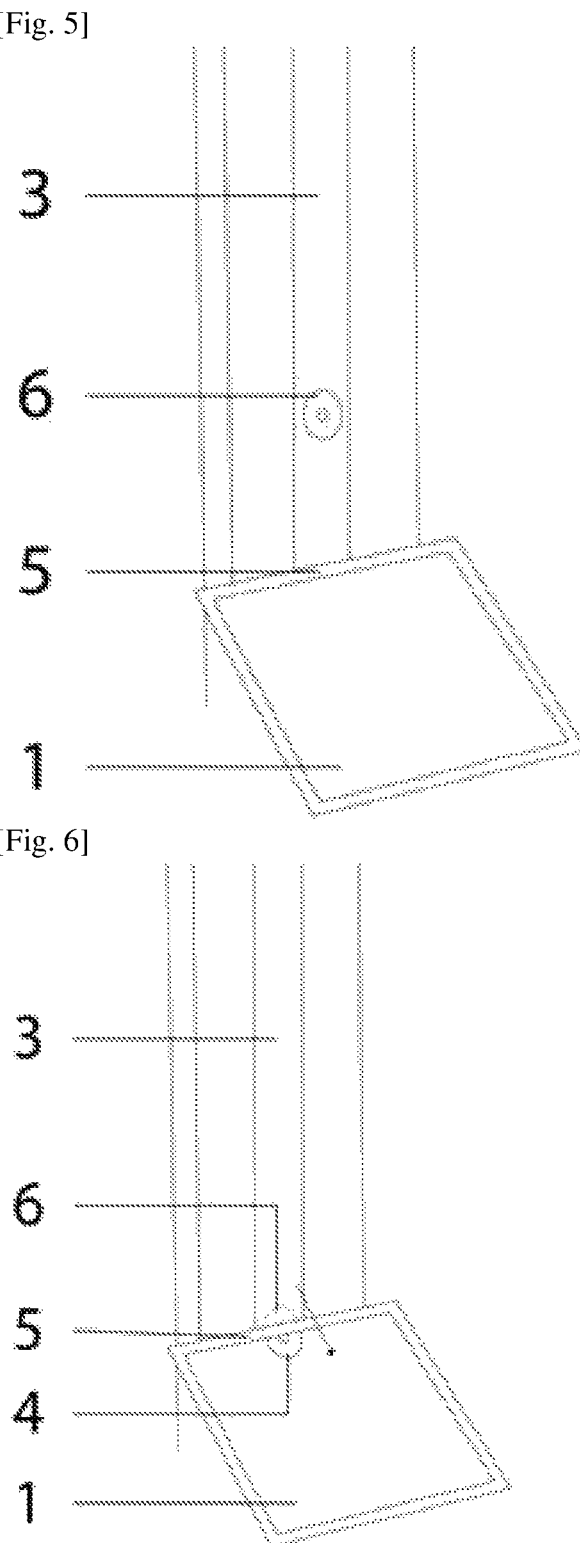

[Fig. 7]
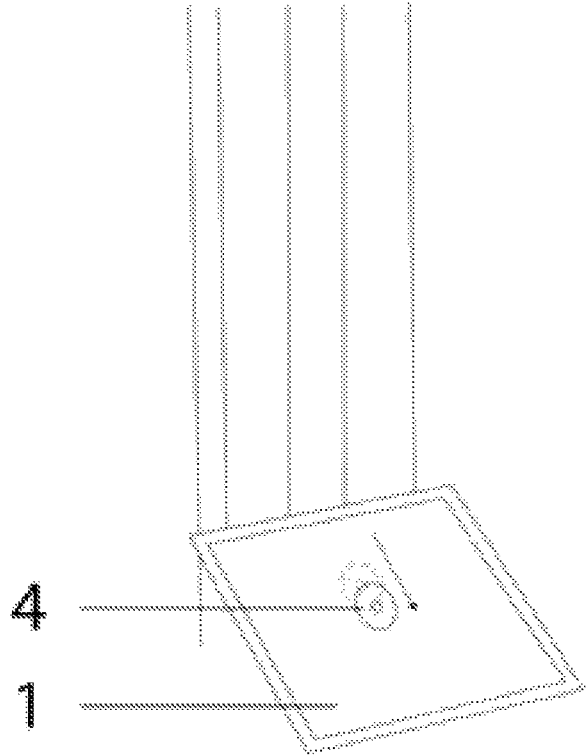
[Fig. 8]
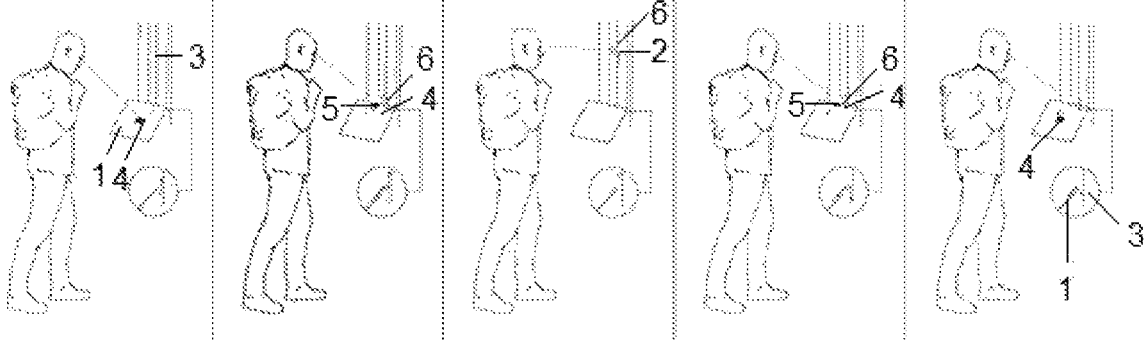

[Fig. 9]
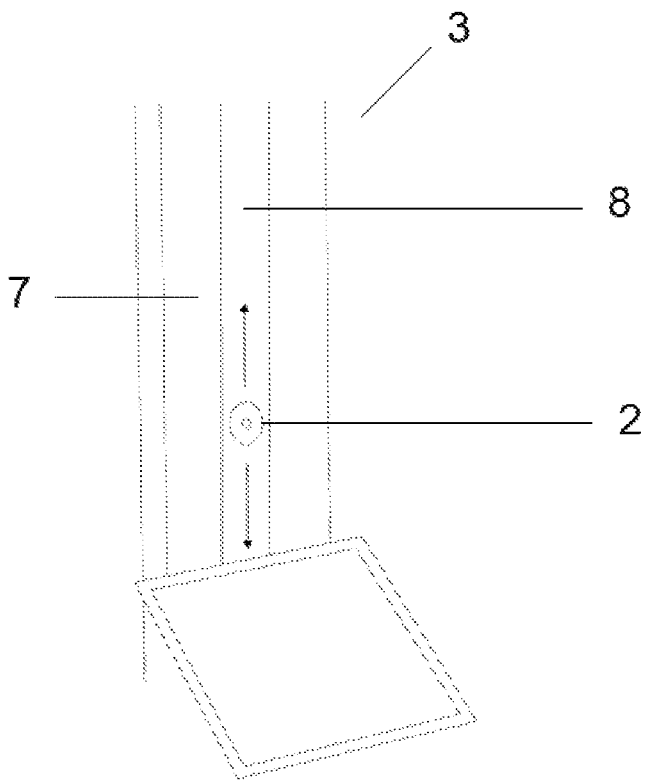
[Fig. 10]
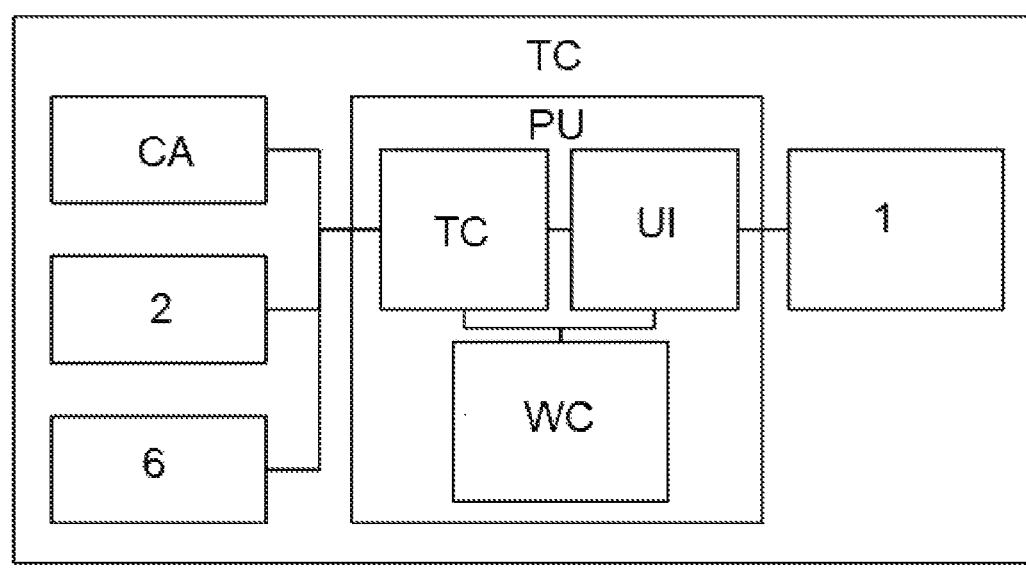

[Fig. 11]

BIOMETRIC CAPTURE SYSTEM AND ASSOCIATED METHOD

CROSS REFERENCE TO RELATED APPLICATIONS

This application is a National Phase of PCT Patent Application No. PCT/PT2022/050027 having International filing date of Oct. 21, 2022, which claims the benefit of priority of Portugal Patent Application No. 117556, filed Nov. 4, 2021, the contents of which are all incorporated herein by reference in their entirety.

TECHNICAL FIELD

The present invention relates to biometric capture systems for the automated control of the identity of a person based on biometric data.

The present invention is applicable to any context where biometric capture for enrolment, verification or identification is required, such as border control, passenger processing during a travel journey or for the issuance of identity documents.

BACKGROUND ART

The biometric capture processes and related systems known in the background art are non-natural processes and devices for humans, where user needs to learn how to use the device properly during its usage, making said process intrusive and slow. The lack of familiarity about how to use a certain device in a border control facility, for example, may result in higher processing times to properly capture biometric data from a passenger. The non-natural systems of the prior art result in longer lines of passengers or contribute to an increase of the investments in several machines, which are installed to work in parallel, in order to maintain an acceptable flow of persons during interactions before increase a border control facility.

The systems and devices for biometric capture have advanced from simple cameras to complex touchpoints with high quality camera sensors, capable of adjusting the height of the camera and the light conditions to achieve the perfect capture. However, most of these prior art devices require a significant user interaction, wherein a user usually stands up before a machine and try to understand what is his or her role in the process, namely when and where shall he or she look to a camera to be captured. The devices of the prior art are characterized to send an explicit command to the user, demanding that the user must look at a camera. This command is displayed on a screen and, after receiving said command, an unfamiliarized user tries to look for the position of the camera on the machine, usually spending some time to identify the location of the camera. These problems are frequent in systems comprising a physical separation between the display where the user inputs data and receive commands and the camera for capturing biometric data.

Therefore, there is a continuous need from the market to improve processing time, and to increase efficiency of operational areas. Moreover, there is a constant trend to increase the quality of captured images at biometric processes, such as ISO 39794-5.

There is a need to make to develop a biometric capture system that be seamless and natural to use by humans, to increase the user experience, increase the throughput and optimize the operational efficiency where a biometric capture is required. There is a need to develop a system that solves the problems of the prior art by reducing the learning curve regarding the process of capturing of the biometric information.

Solution to Problem

The present invention solves the problems of prior art by developing a biometric capture system which contributes with a cross-device transition, offering to the user a continuous experience when the user interacts with a biometric touchpoint.

The goal of the present invention is to provide a natural movement when the focus of the user must perform a transition from the display or screen towards biometric capture physical components, as well as on an opposite direction, from the biometric capture physical components towards the display.

To instruct the user to look at the biometric capture device, a visual element using a combination of digital visual elements (4), for example animated icons and colorful graphic elements, is presented at the screen (1) to catch the focus of the passenger. The digital visual element (4) slides upwards until it disappears from the screen (1). Simultaneously, a physical component showing a related visual element (6) lights up on the vertical guiding device (3), where the image capture module (2) is located. In the most preferred embodiments according to the invention, the digital visual element (4) shown at the screen (1) and the visual element (6) displayed on the vertical guiding device (3) present a similar visual, which can be made of different shapes and colors. The image capture module (2), which comprises the physical element containing the visual element (2), slides upwards from its lowest position and moves vertically, creating the visual effect of an extension of the screen (1). In the most preferred embodiments according to the invention, the visual element (6) contained in the physical element is not visible to the user, when the physical element is located at its lowest position.

To instruct the user to look back at the screen (1) following the biometric capture process, the image capture module (2) presenting the visual element (6) slides downwards until it disappears behind the screen (1). Simultaneously, a related digital visual element (4) shows up on the top part of the screen (1) and slides away from the superior edge of the screen (1) for keeping the focus of the person. In some embodiments according to the invention, the related digital visual element (4) slides to a central area of the screen (1).

In other embodiments according to the invention, a different digital visual element (4) may be presented at the screen (1) when the visual element (6) slides downwards and disappears behind the screen (1), guiding the user to the next step of the workflow.

The present invention contributes with a cross-device transition continuous experience, which is achieved by synchronizing the movement of both visual elements (4,6) presented at the screen (1) and at the image capture module (2), creating a natural and smooth movement transition effect from the screen (1) to the image capture module (2) and from the image capture module (2) to the screen (1).

Advantageous Effects of Invention

The system of the present invention is applicable to the capture of different biometric data, such as facial data or iris data and can be applied to any touchpoint performing self-service or assisted biometric captures.

A particularly advantageous aspect concerns providing a unique solution, which handles naturally the human behaviour during a non-natural and unknown biometric capture process, making it easier and faster for the user to interact and finalize the process with minimal friction.

Therefore, the system of the present invention also allows a faster capture method, which increases the capacity of processing regarding the number of users during a certain period of time, namely when the system of the present invention is installed at border control stations, airports and other travel terminals, or identity management offices.

In another particularly advantageous embodiments, the system of the invention allows a biometric recognition of an individual by means of cross-checking with databases comprising personal data of individuals indexed to digital images.

The system of the present invention can also comprise lightweight hardware elements, which promotes a practical installation in the site and causes a minimal impact on the local infrastructure.

BRIEF DESCRIPTION OF DRAWINGS

With the purpose of promoting an understanding of the principles in accordance with the embodiments of the present invention, reference will be made to the embodiments illustrated in the figures and to the language used to describe the same. Anyway, it must be understood that there is no intention of limiting the scope of the present invention to the contents of the figures. Any alterations or later changes of the inventive features illustrated herein and any additional application of the principles and embodiments of the invention shown, which would occur normally for one skilled in the art when reading this description, are considered as being within the scope of the claimed invention.

FIG. 1 illustrates an embodiment of the biometric capture system for enrolment, verification or identification of a person.

FIG. 2 illustrates a display of a digital visual element (4) on a screen (1) for keeping the focus of the person.

FIG. 3 illustrates a movement of a digital visual element (4) to a superior edge of a screen (1).

FIG. 4 illustrates a transition between a digital visual element (4), displayed on a screen (1), and a visual element (6), displayed by an image capture module (2), at an interface (5).

FIG. 5 illustrates a movement of an image capture module (2) upward along the vertical guiding device (3), while a visual element (6) keeps the focus of the person.

FIG. 6 illustrates a movement of an image capture module (2) downward along a vertical guiding device (3) to the interface (5), after finishing the capturing of the biometric data, and synchronously the activation of a digital visual element (4) at the superior edge of the screen (1), when the said image capture module (2) reaches the interface (5), for keeping the focus of the person.

FIG. 7 illustrates a movement of a digital visual element (4) towards the centre of a screen (1), for keeping the focus of the person.

FIG. 8 illustrates an interaction between the system of the invention and a user.

FIG. 9 illustrates an embodiment of the vertical guiding device (3).

FIG. 10 illustrates an embodiment of the system included in a touchpoint.

Figure 11:
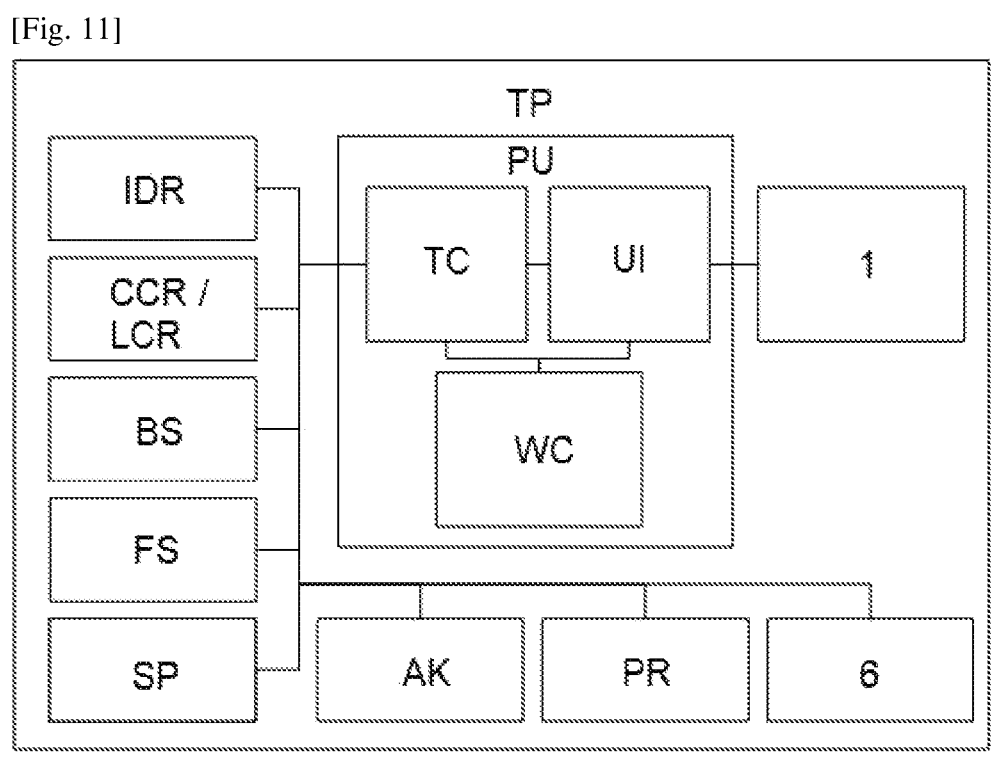

FIG. 11 illustrates a system connected to a plurality of peripheral units.

DESCRIPTION OF EMBODIMENTS

In a first aspect, the present invention refers to a biometric capture system for enrolment, verification or identification of a person comprising:

a processing unit;

a screen (1), which is connected to said processing unit;

a biometric camera for sensing and input of biometric data, which is connected to said processing unit;

an image capture module (2) for capturing of the inputted biometric data from the biometric camera, wherein the image capture module (2) is connected to said processing unit;

a vertical guiding device (3) comprising a base and a vertical trail, wherein the vertical trail of the vertical guiding device (3) is connected to the image capture module (2), which is configured to vertically move along said vertical trail; and wherein further comprising:

an interface (5), wherein said interface (5) is disposed between the superior edge of the screen (1) and the base of the vertical guiding device (3); and base of the vertical guiding device (3); and wherein a digital visual element (4) is displayed on said screen (1); and wherein a visual element (6) is displayed on said image capture module (2); and wherein said biometric capture system is configured to execute a synchronized transition between the digital visual element (4) and the visual element (6) through the interface (5) for keeping the focus of the person.

In a second aspect, the present invention refers to a method for verification, identification or enrolment of a person using a biometric capture system comprising the following steps:

a) providing a screen (1) to start a workflow for a biometric capture of a person;

b) a processing unit sends a first instruction to display a digital visual element (4) on said screen (1) for keeping the focus of the person;

c) the processing unit sends a second instruction to move the said digital visual element (4) to a superior edge of said screen (1);

d) the processing unit sends a third instruction to move the image capture module (2) from the base of the vertical guiding device (3) to an interface (5), wherein said interface (5) is disposed between the superior edge of the screen (1) and a base of a vertical guiding device (3), wherein the said image capture module (2) is further configured to display a visual element (6) when the said image capture module (2) is placed at the interface (5) and next to the said digital visual element (4) for keeping the focus of the person;

e) the processing unit sends a fourth instruction to move the image capture module (2) upward along the vertical guiding device (3), and synchronously to turn off the digital visual element (4), wherein the image capture module (2) is further configured to adjust its position on the vertical guiding device (3) to capture biometric data according to the height of the person, while the visual element (6) keeps the focus of the person;

f) the image capture module (2) captures inputted biometric data from a biometric sensor;

g) the processing unit sends a fifth instruction to move the image capture module (2) downward along the vertical guiding device (3) to the interface (5), after finishing the capturing of the biometric data, and synchronously to turn on the digital visual element (4) at the superior edge of the screen (1), when the said image capture module (2) reaches the interface (5), for keeping the focus of the person;

h) the processing unit sends a sixth instruction to move the digital visual element (4) away from the superior edge of the screen (1) for keeping the focus of the person, and synchronously to turn off the visual element (6).

In the preferred embodiments of the present invention, in the step d), the image capture module (2) is moved the interface (5), which corresponds to the lowest position of the image capture module (2) on the vertical guiding device (3). More preferably, the lowest position of the image capture module (2) on the vertical guiding device (3) is disposed at a position behind the screen (1), which results in the condition that the image capture module (2) is visible hidden from a point of view of the user.

In the preferred embodiments of the present invention, the processing unit comprised in the biometric capture system for enrolment or identification of a person is configured:

to send a first instruction to display the digital visual element (4) on said screen (1) for keeping the focus of the person, as it is illustrated on FIG. 2 or 8, wherein the position of the digital visual element (4) is centred on the screen (1) in the most preferred embodiments; and to send a second instruction to move the said digital visual element (4) to a superior edge of said screen (1), as it is illustrated on FIG. 3; and to send a third instruction to move the image capture module (2) from the base of the vertical guiding device (3) to the interface (5), wherein the said image capture module (2) is further configured to display the visual element (6) when the said image capture module (2) is placed at the interface (5) and next to the said digital visual element (4) for keeping the focus of the person, as it is illustrated on FIG. 4 or 8; and to send a fourth instruction to move the image capture module (2) upward along the vertical guiding device (3), and synchronously to turn off the digital visual element (4), wherein the image capture module (2) is further configured to adjust its position on the vertical guiding device (3) to capture biometric data according to the height of the person, while the visual element (6) keeps the focus of the person, as it is illustrated on FIG. 5 or 8; and to send a fifth instruction to move the image capture module (2) downward along the vertical guiding device (3) to the interface (5), after finishing the capturing of the biometric data, and synchronously to turn on the digital visual element (4) at the superior edge of the screen (1), when the said image capture module (2) reaches the interface (5), for keeping the focus of the person, as it is illustrated on FIG. 6 or 8; and to send a sixth instruction to move the digital visual element (4) away from the superior edge of the screen (1) for keeping the focus of the person, and synchronously to turn off the visual element (6), as it is illustrated on FIG. 7 or 8.

In the preferred embodiments of the invention, the method for verification, identification or enrolment of a person using a biometric capture system, according to the second aspect of the invention uses the biometric capture system according to the first aspect of the invention.

The biometric capture system for enrolment, verification or identification of a person comprises a software layer, which includes three main modules: a module Workflow Controller (WC), a module Touchpoint Controller (TC) and a module User interface Controller (UI).

The module Workflow Controller (WC) is responsible for the orchestration of the biometric capture workflow. The module Touchpoint Controller (TC) is responsible to control the touchpoint devices (biometric camera, screen (1), illumination, image capture module (2), visual element (6) and the camera actuator, as well as the implementation of the biometric capture pipeline. At this level, the system is integrated with the biometric engine to control the quality of the biometric images. The module User interface Controller (UI) receives commands to play media, and to guide the user.

In the preferred embodiments of the architecture of the system of the invention, which is embodied in a touchpoint (TP), as illustrated in FIG. 10, when the module Workflow Controller (WC) is instructed to execute the biometric capture workflow, a command to play media is sent to the module User interface Controller (UI). Immediately, the visual element (6) is displayed on the screen (1) and after a predefined period of time, which sets up a transition time, the module Workflow Controller (WC) sends a new command, this time to the module Touchpoint Controller (TC), so the visual element (6) turns on and the image capture module (2) starts moving to a predefined position. The predefined position of the image capture module (2) is placed at a base of the vertical guiding device (3) as a camera's_default_position. The configurable variable transition_time allows fine tuning of the smooth transition between the digital visual element (4) to the physical visual element (6).

Another implementation available, brings a different approach to control the transition effect of the digital visual element (4) to the physical visual element (6), this time using a notification back from the module User interface Controller (UI) to the module Workflow Controller (WC). This notification is sent when the digital visual element (4) is at a specific position on the screen (1), defined as a transition_position. When that notification is received by the module Workflow Controller (WC), it immediately sends a command to the module Touchpoint Controller (TC) to turn on the physical visual element (6) and start moving the image capture module (2) to the default position, defined as a camera's_default_position.

The processing unit is configured to send instructions to three main modules, namely the module Workflow Controller (WC), the module Touchpoint Controller (TC), and the module User interface Controller (UI).

In the preferred embodiments of the present invention, the screen (1) is a touchscreen, which is used by the user to input personal data and other information required during the workflow, where the display is the primary mode of interaction for the user, wherein all the relevant steps of the workflow are presented at the display via a front-end application. Preferably, the screen (1) is disposed at an oblique angle in relation to the axis of the vertical guiding device (3), in order to ergonomically act during the interaction with the user.

Once the process of identification or capture of a person starts, the digital visual element (4) presented at the screen (1) move towards the direction of image capture module (2), at the same time, the image capture module (2) is in sync with the digital visual element (4) and when the digital visual element (4) reaches the border of the screen (1), there is a smooth transition between the digital device and the physical biometric capture device. Preferably, the digital visual element (4) is one or more selected from the group consisting of a digital image or a multimedia icon.

Once the transition from digital to physical finalizes, the image capture module (2) by its visual element (6) guides the user to the proper height, as it is illustrated in FIG. 8. In the preferred embodiments of the present invention, an image capture module (2) is any digital camera comprising sensors that allow a proper adjustment to capture the biometric data with the optimum quality. The image capture module (2) is configured to adjust its position on the vertical guiding device (3) to capture biometric data according to the height of the person, while the visual element (6) keeps the focus of the person.

Preferably, the biometric data captured by the image capture module (2) is one or more selected from the group consisting of a facial feature geometry or an iris scan for enrolment, verification or identification.

When the capturing of biometric data is finished, the image capture module (2) device moves back to the direction of the screen (1). The visual element (6) may present a different pattern regarding, for example, colours, shapes or flickering effects, in order to visually inform that the capturing of the biometric data is finished. Preferably, the visual element (6) comprises a plurality of LEDs.

When the image capture module (2) reaches the interface (5), for example the top border of the screen (1), there is another transition but now from physical to digital, and when digital visual element (4) is fully available at the screen (1), it drives the user attention back to the screen (1). Therefore, the workflow can proceed to the original estate.

In the preferred embodiments according to the invention, as illustrated in FIG. 9, a cover (7) is connected to the frontal side of the vertical guiding device (3), wherein the image capture module (2) and the vertical trail are disposed in a recess (8) disposed along the vertical guiding device (3). Therefore, the image capture module (2) is disposed behind said cover (7) or plate. Preferably, the cover (7) is made of a transparent or translucid material and said cover may present the shape of a plate.

In other embodiments of the invention, as illustrated in FIG. 11, at least one peripheral unit is connected to the processing unit, wherein said peripheral unit is selected from the group consisting of an identity document reader (IDR); a contact card reader (CCR); a contactless card reader (LCR); a barcode scanner (BS); a fingerprint scanner (FS); a signature pad (SP); an accessibility keypad (AK); and a printer unit (PR).

As used in this description, the expressions "about" and "approximately" refer to a range in values of roughly 10% the specified number.

As used in this description, the expression "substantially" means that the real value is within an interval of about 10% of the desired value, variable or related limit, particularly within about 5% of the desired value, variable or related limit or particularly within about 1% of the desired value, variable or related limit.

As used in this description, the expression "facial identification" includes the indexing of a unique identifier code to an individual's face captured in one or more images, based on the extraction of features, in which the unique identifier code does not comprise individual's personal data.

As used in this description, the expression "facial capture" includes the identification of an individual after searching in a database for features extracted from one or more images of an individual, wherein the individual's face or iris was previously identified, and wherein the database comprises personal data indexed to digital image features of the faces or retinas of a plurality of individuals.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

The subject matter described above is provided as an illustration of the present invention and must not be interpreted to limit it. The terminology used with the purpose of describing specific embodiments, according to the present invention, must not be interpreted to limit the invention. As used in this description, the definite and indefinite articles, in their singular form, aim to include in the interpretation the plural forms, unless the context of the description explicitly indicates the contrary. It will be understood that the expressions "comprise" and "include", when used in this description, specify the presence of the characteristics, the elements, the components, the steps and the related operations, but do not exclude the possibility of other characteristics, elements, components, steps and operations from being also contemplated.

All modifications, providing that they do not modify the essential features of the following claims, must be considered within the scope of protection of the present invention.

REFERENCE SIGNS LIST

1. A screen
2. An image capture module
3. A vertical guiding device
4. A digital visual element
5. An interface
6. A visual element
7. A cover
8. A recess
PU. A processing unit
UI. A module User interface Controller
WC. A module Workflow Controller
TC. A module Touchpoint Controller
CA. A camera actuator
TP. A touchpoint
IDR. An identity document reader
CCR. A contact card reader
LCR. A contactless card reader
BS. A barcode scanner
FS. A fingerprint scanner
SP. A signature pad
AK. An accessibility keypad
PR. A printer unit

The invention claimed is:

1. A biometric capture system for enrolment, verification or identification of a person comprising:
   a processing unit;
   a screen (1), which is connected to said processing unit and is configured to start a workflow for a biometric capture of a person;
   a biometric camera for sensing and input of biometric data, which is connected to said processing unit;
   an image capture module (2) for capturing of the inputted biometric data from the biometric camera, wherein the biometric camera for sensing and input of biometric data is comprised in said image capture module (2), and wherein the image capture module (2) is connected to said processing unit;

a vertical guiding device (3) comprising a base and a vertical trail, wherein the vertical trail of the vertical guiding device (3) is connected to the image capture module (2), which is configured to vertically move along said vertical trail; and further comprising:

an interface (5), wherein said interface (5) is disposed between the superior edge of the screen (1) and the base of the vertical guiding device (3); and wherein a digital visual element (4) is displayed on said screen (1); and wherein a visual element (6) is displayed on said image capture module (2); and wherein said biometric capture system is configured to execute a synchronized transition between the digital visual element (4) and the visual element (6) through the interface (5) for keeping the focus of the person;

characterized in that the processing unit is configured:

to send a first instruction to display the digital visual element (4) on said screen (1) for keeping the focus of the person; and to send a second instruction to move the said digital visual element (4) to a superior edge of said screen (1); and to send a third instruction to move the image capture module (2) from the base of the vertical guiding device (3) to the interface (5), wherein the said image capture module (2) is further configured to display the visual element (6) when the said image capture module (2) is placed at the interface (5) and next to the said digital visual element (4) for keeping the focus of the person; and to send a fourth instruction to move the image capture module (2) upward along the vertical guiding device (3), and synchronously to turn off the digital visual element (4), wherein the image capture module (2) is further configured to adjust its position on the vertical guiding device (3) to capture biometric data according to the height of the person, while the visual element (6) keeps the focus of the person; and to send a fifth instruction to move the image capture module (2) downward along the vertical guiding device (3) to the interface (5), after finishing the capturing of the biometric data, and synchronously to turn on the digital visual element (4) at the superior edge of the screen (1), when the said image capture module (2) reaches the interface (5), for keeping the focus of the person; and to send a sixth instruction to move the digital visual element (4) away from the superior edge of the screen (1) for keeping the focus of the person, and synchronously to turn off the visual element (6).

2. The biometric capture system for enrolment, verification or identification of a person, according to claim 1, wherein the screen (1) is a touchscreen.

3. The biometric capture system for enrolment, verification or identification of a person, according claim 1, wherein the biometric data is one or more selected from the group consisting of a facial feature geometry or an iris scan for enrolment, verification or identification.

4. The biometric capture system for enrolment, verification or identification of a person, according to claim 1, wherein the digital visual element (4) is one or more selected from the group consisting of a digital image or a multimedia icon.

5. The biometric capture system for enrolment, verification or identification of a person, according claim 1, wherein the screen (1) is disposed at an oblique angle in relation to the axis of the vertical guiding device (3).

6. The biometric capture system for enrolment, verification or identification of a person, according to claim 1, wherein at least one input device or a printer unit is connected to said processing unit, wherein said input device is selected from the group consisting of a keypad, which is configured for a user to input alphanumeric characters; a code reader device, which is configured to read an optically readable code; and a personal identification document reader; wherein the printer unit is configured to materialize a document.

7. A method for verification, identification or enrolment of a person using a biometric capture system, defined according to claim 1, characterized by comprising the following steps:

a) providing a screen (1) to start a workflow for a biometric capture of a person;

b) a processing unit sends a first instruction to display a digital visual element (4) on said screen (1) for keeping the focus of the person;

c) the processing unit sends a second instruction to move the said digital visual element (4) to a superior edge of said screen (1);

d) the processing unit sends a third instruction to move the image capture module (2) from the base of the vertical guiding device (3) to an interface (5), wherein said interface (5) is disposed between the superior edge of the screen (1) and a base of a vertical guiding device (3), wherein the said image capture module (2) is further configured to display a visual element (6) when the said image capture module (2) is placed at the interface (5) and next to the said digital visual element (4) for keeping the focus of the person;

e) the processing unit sends a fourth instruction to move the image capture module (2) upward along the vertical guiding device (3), and synchronously to turn off the digital visual element (4), wherein the image capture module (2) is further configured to adjust its position on the vertical guiding device (3) to capture biometric data according to the height of the person, while the visual element (6) keeps the focus of the person;

f) the image capture module (2) captures inputted biometric data from a biometric sensor;

g) the processing unit sends a fifth instruction to move the image capture module (2) downward along the vertical guiding device (3) to the interface (5), after finishing the capturing of the biometric data, and synchronously to turn on the digital visual element (4) at the superior edge of the screen (1), when the said image capture module (2) reaches the interface (5), for keeping the focus of the person;

h) the processing unit sends a sixth instruction to move the digital visual element (4) away from the superior edge of the screen (1) for keeping the focus of the person, and synchronously to turn off the visual element (6).

8. The method for verification, identification or enrolment of a person using a biometric capture system, according to claim 7, wherein the biometric data is one or more selected from the group consisting of a facial feature geometry or an iris scan.

9. The method for verification, identification or enrolment of a person using a biometric capture system, according claim 8, wherein the digital visual element (4) is one or more selected from the group consisting of a digital image or a multimedia icon.

10. The method for verification, identification or enrolment of a person using a biometric capture system, according to claim 8, wherein at least one peripheral unit is connected to the processing unit, wherein said peripheral unit is selected from the group consisting of an identity document reader; a contact card reader; a contactless card reader; a barcode scanner; a fingerprint scanner; a signature pad; an accessibility keypad; and a printer unit.

\* \* \* \* \*